(12) United States Patent
Yum et al.

(10) Patent No.: US 10,374,664 B2
(45) Date of Patent: Aug. 6, 2019

(54) METHOD FOR REPORTING CHANNEL STATE IN WIRELESS COMMUNICATION SYSTEM AND APPARATUS THEREFOR

(71) Applicant: LG ELECTRONICS INC., Seoul (KR)

(72) Inventors: Kunil Yum, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,097

(22) PCT Filed: Oct. 31, 2016

(86) PCT No.: PCT/KR2016/012338
§ 371 (c)(1),
(2) Date: May 2, 2018

(87) PCT Pub. No.: WO2017/078338
PCT Pub. Date: May 11, 2017

(65) Prior Publication Data
US 2018/0331742 A1 Nov. 15, 2018

Related U.S. Application Data

(60) Provisional application No. 62/257,621, filed on Nov. 19, 2015, provisional application No. 62/257,225, (Continued)

(51) Int. Cl.
*H04B 7/04* (2017.01)
*H04B 7/06* (2006.01)

(52) U.S. Cl.
CPC ............... *H04B 7/04* (2013.01); *H04B 7/06* (2013.01); *H04B 7/0621* (2013.01); *H04B 7/0626* (2013.01); *H04B 7/0643* (2013.01)

(58) Field of Classification Search
CPC combination set(s) only.
See application file for complete search history.

(56) References Cited

U.S. PATENT DOCUMENTS 9,397,734 B2 * 7/2016 Lee .................... H04B 7/0617
9,532,362 B2 * 12/2016 Marinier ................ H04W 72/06
(Continued)

FOREIGN PATENT DOCUMENTS

EP 2439997 A1 4/2012
EP 2894920 A1 7/2015
(Continued)

OTHER PUBLICATIONS

R1-155378: 3GPP TSG RAN WG1 Meeting #82bis, Malmo, Sweden, Oct. 5-9, 2015, LG Electronics, "Aperiodic CSI related enhancement for Rel-13 CA," pp. 1-3.
(Continued)

*Primary Examiner* — Linda Wong
(74) *Attorney, Agent, or Firm* — Dentons US LLP

(57) ABSTRACT

A method for reporting an aperiodic channel condition in a wireless communication system, according to an embodiment of the present invention, is performed by a terminal. The method comprises the steps of: receiving, from a base station, setting for one or more channel state information (CSI) processes including a plurality of channel state information-reference signals (CSI-RS) resources, wherein precoding is applied to each of the plurality of CSI-RS resources; receiving an aperiodic CSI report request from the base station; and transmitting, to the base station, an aperiodic CSI for a CSI process indicated by the aperiodic CSI report request, wherein, if a certain time has not elapsed after a CSI-RS resource index for the CSI process indicated by the aperiodic CSI report request is reported, the trans- (Continued)

mitted aperiodic CSI may include a CSI-RS resource index for a CSI process which has not been updated.

10 Claims, 8 Drawing Sheets

Related U.S. Application Data filed on Nov. 18, 2015, provisional application No. 62/256,693, filed on Nov. 17, 2015, provisional application No. 62/250,489, filed on Nov. 3, 2015.

(56) References Cited

U.S. PATENT DOCUMENTS

| | | | |
|---|---|---|---|
| 2010/0020996 A1* | 1/2010 | Elmedyb | H04R 25/453 |
| | | | 381/318 |
| 2011/0013719 A1 | 1/2011 | Taoka et al. | |
| 2012/0076028 A1* | 3/2012 | Ko | H04L 1/0026 |
| | | | 370/252 |
| 2013/0028182 A1 | 1/2013 | Geirhofer et al. | |
| 2013/0028225 A1* | 1/2013 | Ko | H04B 7/0486 |
| | | | 370/329 |
| 2013/0182789 A1* | 7/2013 | Ko | H04B 7/0626 |
| | | | 375/267 |
| 2014/0078990 A1* | 3/2014 | Lee | H04L 1/0026 |
| | | | 370/329 |
| 2014/0086352 A1* | 3/2014 | Ko | H04B 7/0486 |
| | | | 375/267 |
| 2014/0105055 A1* | 4/2014 | Kang | H04W 24/10 |
| | | | 370/252 |
| 2014/0135004 A1* | 5/2014 | Patel | H04W 52/143 |
| | | | 455/435.1 |
| 2015/0208397 A1* | 7/2015 | Lee | H04L 5/0048 |
| | | | 370/329 |
| 2015/0256246 A1* | 9/2015 | Ishihara | H04B 7/0615 |
| | | | 375/267 |
| 2015/0327119 A1* | 11/2015 | Ko | H04L 1/0026 |
| | | | 370/252 |
| 2016/0156397 A1* | 6/2016 | Onggosanusi | H04B 7/0456 |
| | | | 370/252 |
| 2016/0295630 A1* | 10/2016 | Gubeskys | H04B 7/0456 |

FOREIGN PATENT DOCUMENTS

| | | |
|---|---|---|
| KR | 20150039746 A | 4/2015 |
| KR | 20150060916 A | 6/2015 |

OTHER PUBLICATIONS

R1-155482: 3GPP TSG RAN WG1 Meeting #82bis, Malmo, Sweden, Oct. 5-9, 2015, Samsung, "Discussion on aperiodic CSI-RS resource configuration for class B CSI reporting," pp. 1-4.

* cited by examiner

METHOD FOR REPORTING CHANNEL STATE IN WIRELESS COMMUNICATION SYSTEM AND APPARATUS THEREFOR

This application is a 35 use § 371 national stage entry of international application no. PCT/KR2016/012338 filed on Oct. 31, 2016, and claims priority to U.S. provisional application Nos. 62/250,489 filed on Nov. 3, 2015; 62/256,693 filed on Nov. 17, 2015; 62/257,225 filed on Nov. 18, 2015 and 62/257,621 filed on Nov. 19, 2015, all of which are hereby incorporated by reference in their entireties as if fully set forth herein.

TECHNICAL FIELD

The present invention relates to a wireless communication system, and more particularly, to a method of reporting a channel state in a wireless communication system and an apparatus therefor.

BACKGROUND ART

In accordance with the introduction of FD (full dimension) MIMO (multiple input multiple output) environment, 2D domain to be used by a UE can be determined/used by transmitting K (>1) number of CSI-RS (reference signal) resources to which different 2D (vertical and/or horizontal) precoding is applied to a single CSI (channel state information) process. In this case, when the UE reports a CSI-RS resource or the 2D domain to a base station, it is necessary for the UE to have a method capable of reducing UE complexity and unnecessary transmission.

DISCLOSURE OF THE INVENTION

Technical Task

A technical task of the present invention is to provide a method of reporting a channel state in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting an aperiodic channel state, which is reported by a terminal in a wireless communication system, includes receiving a configuration for one or more channel state information (CSI) processes including a plurality of CSI-reference signal (CSI-RS) resources from a base station, wherein a precoding is applied to each of the plurality of the CSI-RS resources, receiving an aperiodic CSI report request from the base station, and transmitting an aperiodic CSI on a CSI process indicated by the received aperiodic CSI report request to the base station. In this case, when a predetermined time does not elapse after a CSI-RS resource index for the CSI process indicated by the aperiodic CSI report request is reported, the transmitted aperiodic CSI may include the CSI-RS resource index for the CSI process which is not updated.

Additionally or alternatively, remaining channel state-related information included in the transmitted aperiodic CSI may be calculated on a CSI-RS resource indicated by the CSI-RS resource index.

Additionally or alternatively, the predetermined time may correspond to time for 5 subframes.

Additionally or alternatively, the CSI-RS resource index may be always transmitted together with other channel state-related information.

Additionally or alternatively, the transmitted aperiodic CSI may include the CSI-RS resource index for the CSI process which is not updated when a specific time does not elapse after the CSI-RS resource index for the CSI process indicated by the aperiodic CSI report request was reported and the total number of antenna ports for all CSI-RS resources of the CSI process exceeds a threshold.

Additionally or alternatively, the transmitted aperiodic CSI may include the CSI-RS resource index for the CSI process which is not updated when a specific time does not elapse after the CSI-RS resource index for the CSI process indicated by the aperiodic CSI report request was reported and the number of the plurality of the CSI-RS resources exceeds a threshold.

To further achieve these and other advantages and in accordance with the purpose of the present invention, according to a different embodiment, a terminal configured to report an aperiodic channel state in a wireless communication system includes a transmitter, a receiver, and a processor that controls the transmitter and the receiver, the processor receives a configuration for one or more channel state information (CSI) processes including a plurality of CSI-reference signal (CSI-RS) resources from a base station, wherein a precoding is applied to each of the plurality of the CSI-RS resources, receives an aperiodic CSI report request from the base station, and transmits aperiodic CSI on a CSI process indicated by the received aperiodic CSI report request to the base station. In this case, when a predetermined time does not elapse after a CSI-RS resource index for the CSI process indicated by the aperiodic CSI report request was reported, the transmitted aperiodic CSI may include the CSI-RS resource index for the indicated CSI process which is not updated.

Additionally or alternatively, remaining channel state-related information included in the transmitted aperiodic CSI may be calculated on a CSI-RS resource indicated by the CSI-RS resource index.

Additionally or alternatively, the predetermined time may correspond to time for 5 subframes.

Additionally or alternatively, the CSI-RS resource index may be always transmitted together with other channel state-related information.

Additionally or alternatively, the transmitted aperiodic CSI may include the CSI-RS resource index for the CSI process which is not updated when a specific time does not elapse after the CSI-RS resource index for the CSI process indicated by the aperiodic CSI report request was reported and the total number of antenna ports for all CSI-RS resources of the CSI process exceeds a threshold.

Additionally or alternatively, the transmitted aperiodic CSI can include a CSI-RS resource index for the CSI process which is not updated when a specific time does not elapse after the CSI-RS resource index for the CSI process indicated by the aperiodic CSI report request was reported and the number of the plurality of the CSI-RS resources exceeds a threshold.

Technical solutions obtainable from the present invention are non-limited the above-mentioned technical solutions.

And, other unmentioned technical solutions can be clearly understood from the following description by those having ordinary skill in the technical field to which the present invention pertains.

Advantageous Effects

According to one embodiment of the present invention, it is able to make a channel state to be efficiently reported in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
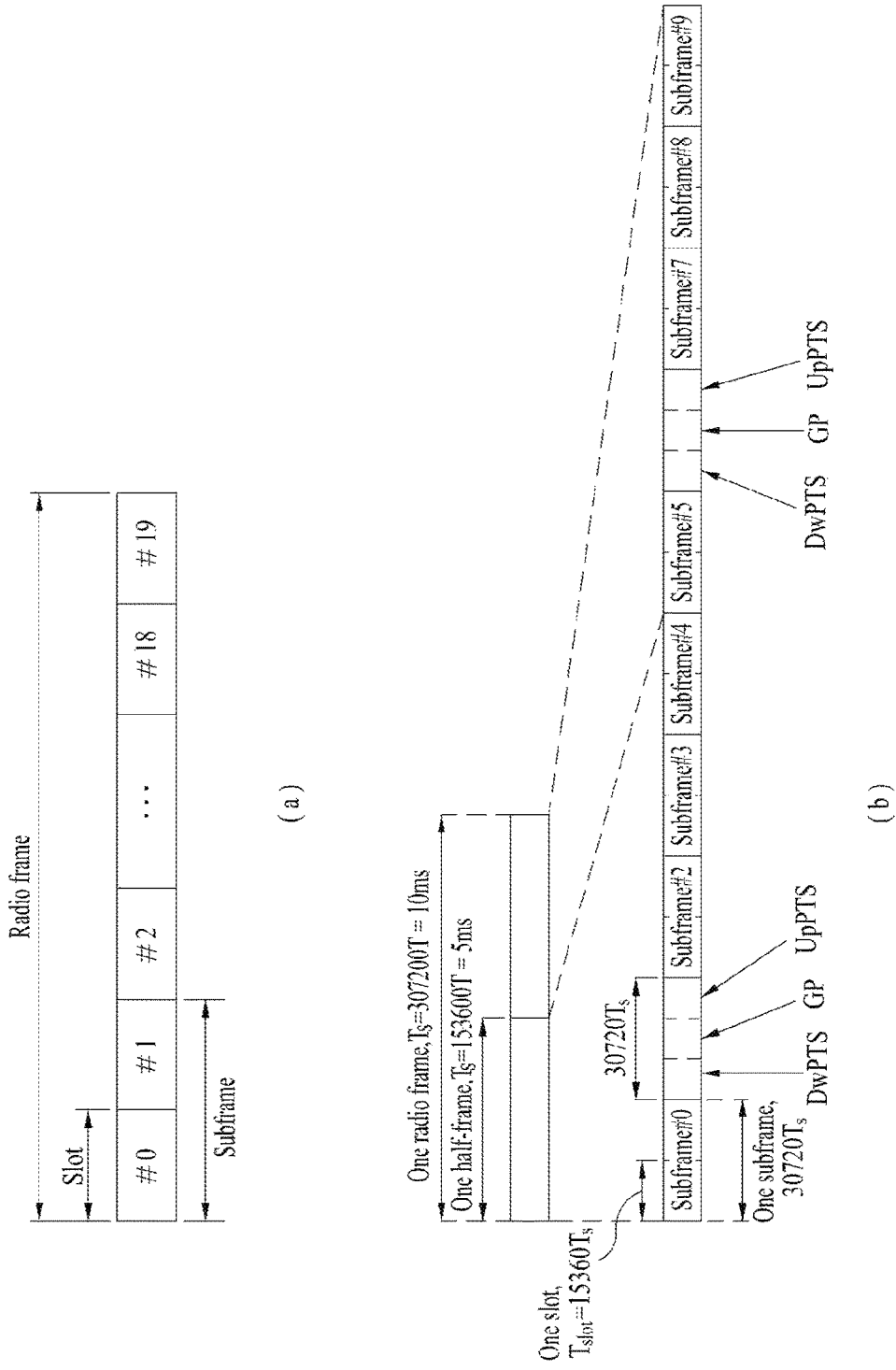
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             | —            | —            |

Figure 2:
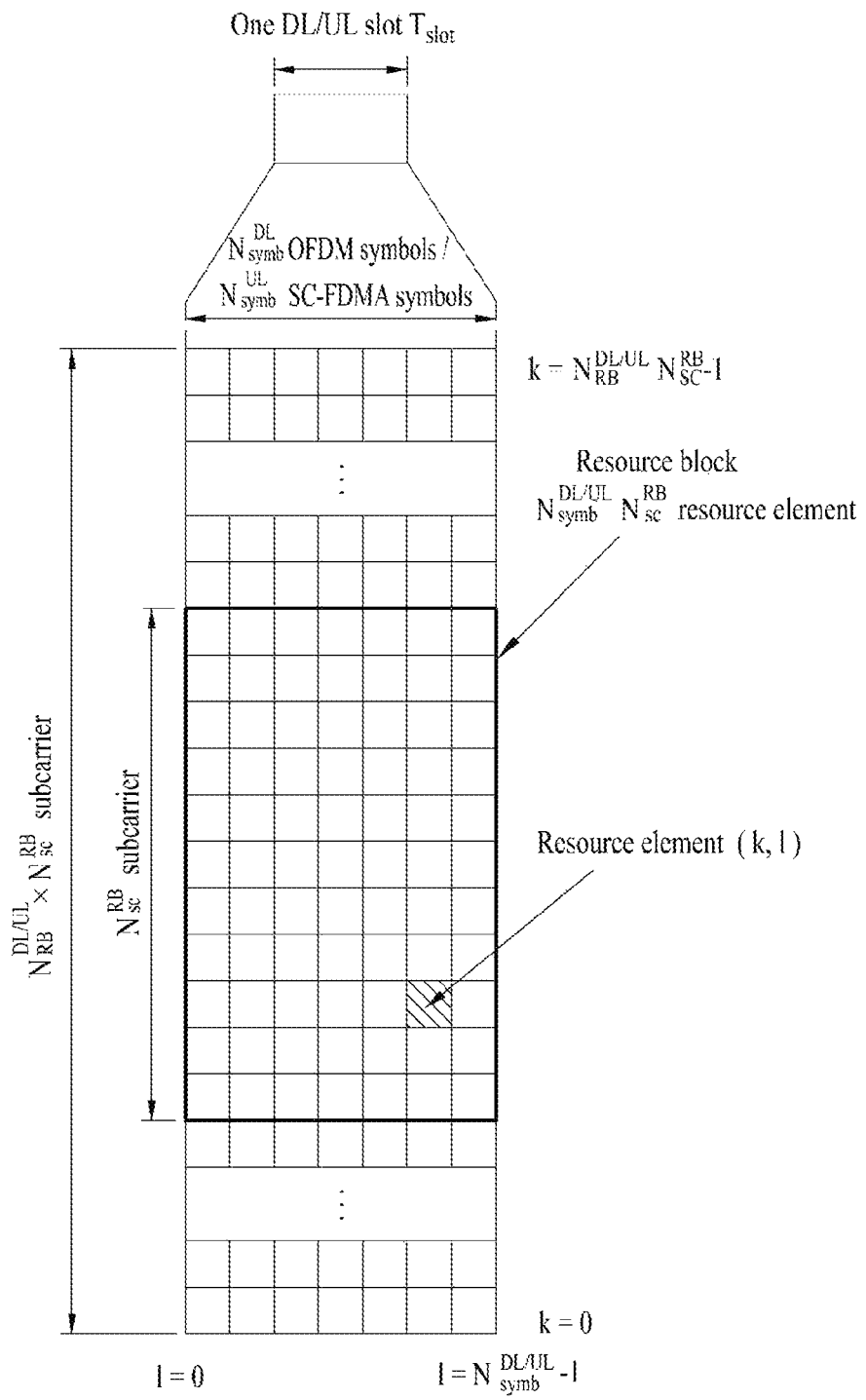
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each 01-DM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and 1 is an index in the range of 0 to symb $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
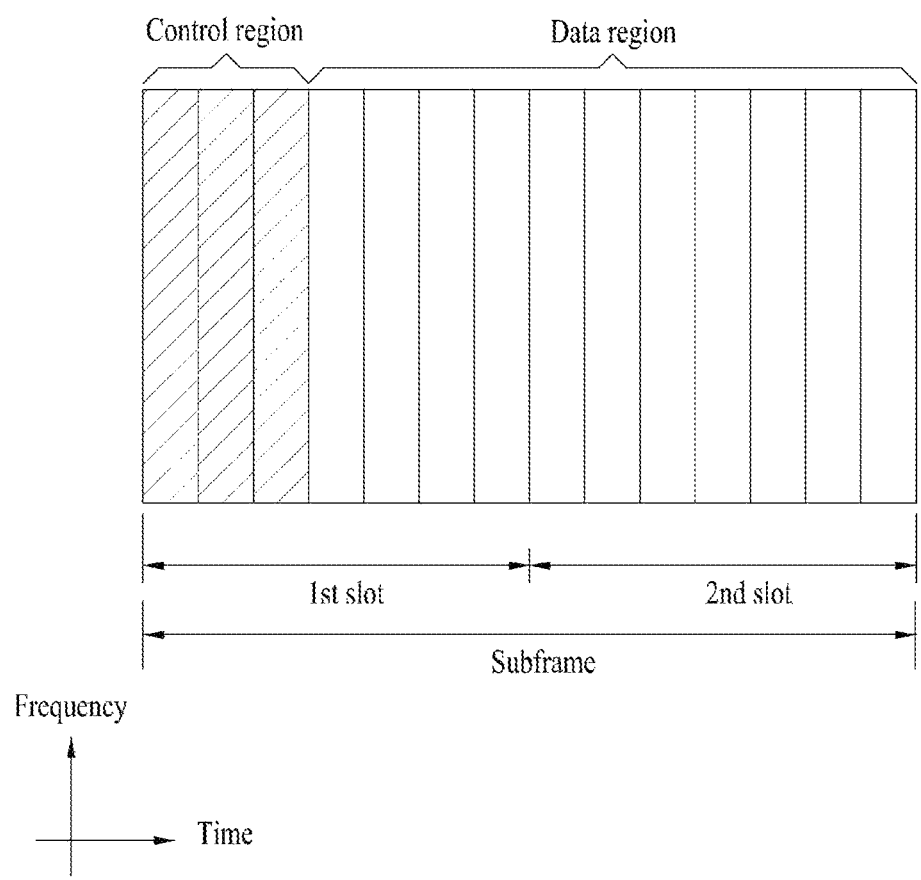
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
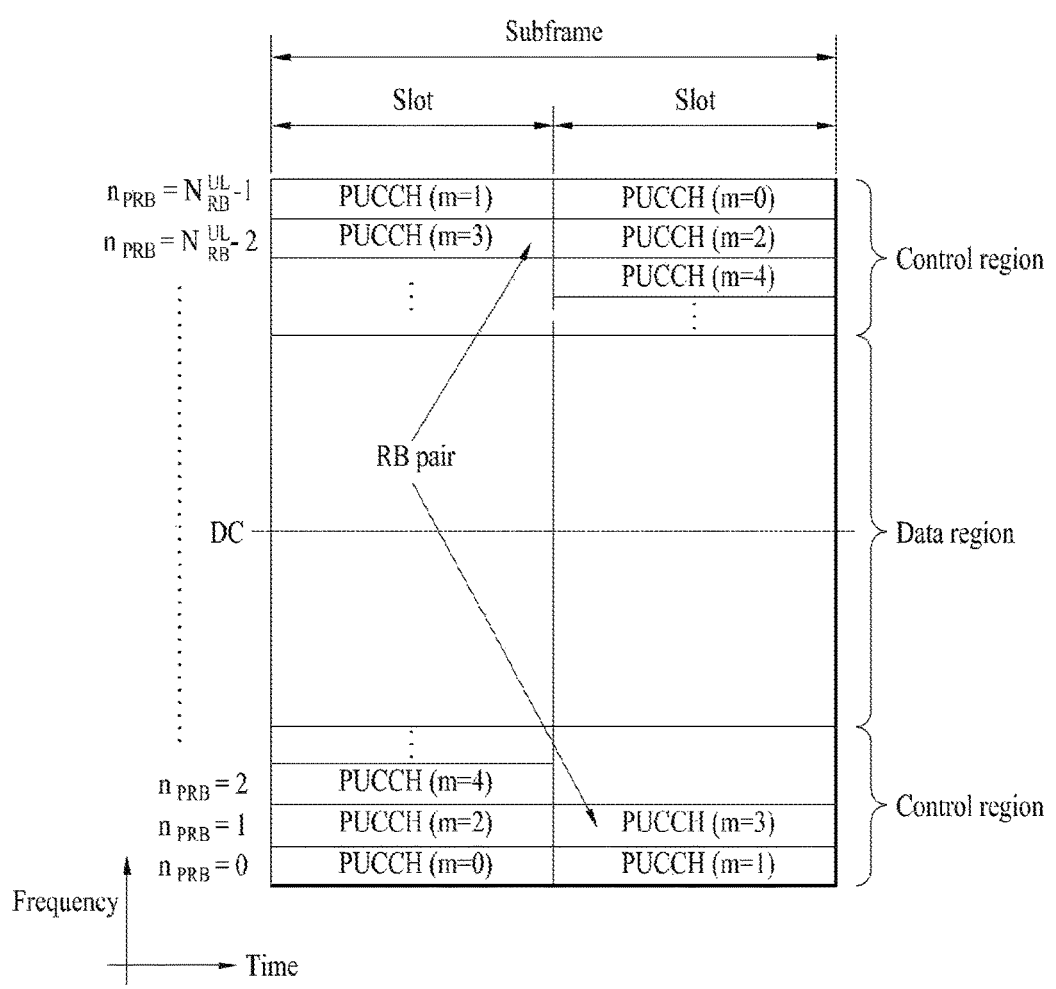
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4 bit)<br>2nd wideband CQI(4 bit)<br>if RI > 1<br>N*Subband PMI(4 bit)<br>(N is the total # of subbands)<br>(if 8Tx Ant, N*subband W2 + wideband W1) |
| | UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| | Higher Layer-configured (Subband CQI) | Mode 3-0<br>RI (only for Open-loop SM)<br>1st wideband CQI(4 bit) + N*subbandCQI(2 bit) | Mode 3-1<br>RI<br>1st wideband CQI(4 bit) + N*subbandCQI(2 bit)<br>2nd wideband CQI(4 bit) + N*subbandCQI(2 bit)<br>if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit)<br>if RI > 1<br>N*Subband PMI(4 bit)<br>(N is the total # of subbands)<br>(if 8Tx Ant, N*subband W2 + wideband W1) |

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
| --- | --- |
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
| --- | --- |
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

Figure 5:
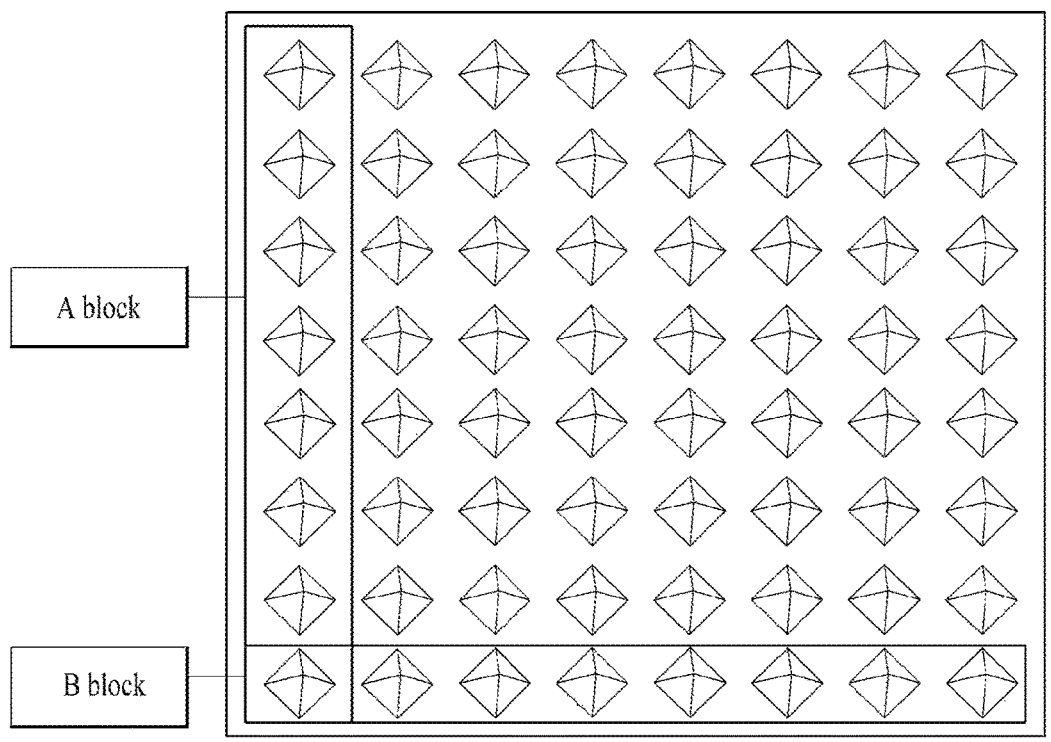
FIG. 5 illustrates 2D (dimension) or FD (full dimension) antenna structure.

A wireless communication system appearing after LTE Rel-12 considers introducing an antenna system utilizing an active antenna system (hereinafter, AAS). Since the AAS corresponds to a system that each antenna is configured as an active antenna including an active circuit, the AAS is expected as a technology capable of reducing interference by changing an antenna pattern in accordance with a situation and the technology capable of more efficiently performing beamforming. When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern. As shown in FIG. 5, since the 2D-AAS arranges antennas in vertical direction and horizontal direction, it is anticipated that a massive antenna system is to be constructed. A transmission/reception scheme performed according to the introduction/use of the 2D-AAS is referred to as EB (elevation beamforming)/FD (full dimension)–MIMO.

[Class A CSI Reporting]

In FD-MIMO system, a base station can set a plurality of CSI-RS resources belonging to a single CSI process to a UE. The UE does not consider the CSI-RS resources configured within a signal CSI process as an independent channel. The UE assumes the resources as a single huge CSI-RS resource by aggregating the resources. The UE calculates CSI based on the single huge CSI-RS resource and feed backs the calculated CSI. For example, if the base station sets three 4-port CSI-RS resources belonging to a signal CSI process to the UE, the UE assumes one 12-port CSI-RS resource by aggregating the three 4-port CSI-RS resources. The UE calculates CSI based on the 12-port CSI-RS resource using 12-port PMI and feed backs the calculated CSI.

[Class B CSI Reporting]

In FD-MIMO system, a base station can set a plurality of CSI-RS resources belonging to a single CSI process to a UE. For example, the base station can configure 8 CSI-RS resources within a single CSI process. Each of 8 CSI-RS resources can be configured by 4-port CSI-RS. It may apply different beamforming by applying different virtualization to each of 8 4-port CSI-RSs. For example, vertical beamforming is applied to a first CSI-RS with a zenith angle of 100 degrees. Since CSI-RSs are configured with a zenith angle difference of 5 degrees, vertical beamforming can be applied to an $8^{th}$ CSI-RS with a zenith angle of 135 degrees.

A UE assumes each of the CSI-RS resources as an independent channel and selects one from among the CSI-RS resources. The UE calculates and reports CSI on the basis of the selected resource. In particular, the UE selects a CSI-RS of a strong channel from among the 8 CSI-RS resources, calculates CSI on the basis of the selected CSI-RS, and reports the CSI to the base station. In this case, the UE additionally reports the selected CSI-RS to the base station via a CRI (CSI-RS resource indicator) value. For example, if a channel of the first CSI-RS is strongest, the UE configures CRI=0 and reports the first CSI-RS to the base station.

In order to effectively show the aforementioned characteristic, a variable described in the following can be defined for a CSI process in the class B. K corresponds to the number of CSI-RS resources existing in a CSI process. $N_k$ corresponds to the number of CSI-RS ports of a $k^{th}$ CSI-RS resource. In the aforementioned example, K corresponds to 8 and $N_k$ is configured by 4 irrespective of a value of k.

According to a current 3GPP LTE Rel-13, a CRI indicates a specific CSI-RS resource. Yet, a future CRI may indicate a combination of specific ports of a specific CSI-RS. For example, a CRI selects one from among 8 CSI-RSs belonging to a CSI process and selects a combination of ports 15 and 16 within an additionally selected CSI-RS. If it is able to select either a combination of ports 15 and 16 or a combination of ports 17 and 18 from each of 8 CSI-RSs, a CRI can indicate a value (i.e., an integer value among 0 to 15) among 16 values and each value indicates one of 16 CSI-RSs in total. For example, a combination of ports 15 and 16 of a first CSI-RS, a combination of ports 17 and 18 of the first CSI-RS, a combination of ports 15 and 16 of a second CSI-RS, and a combination of ports 17 and 18 of the second CSI-RS are respectively mapped in an order of CRI=0, CRI=1, CRI=2, and CRI=3. In particular, a combination of ports 17 and 18 of the last CSI-RS (i.e., $8^{th}$ CSI-RS) is finally mapped to CRI=15.

Similar to EB (elevation beamforming)/FD (full dimension)–MIMO, using a dimension of a vertical domain is considering. To this end, LTE considers a method of including two or more CSI-RS resources in a single CSI process and applying a different precoding to each of the CSI-RS resources. The K number of CSI-RS resources each of which has $N_k$ number of ports is defined within the number of antenna ports as many as $N_{total}$ within a single CSI process and transmission is performed by applying a different vertical (or, 2D) precoding to each of the CSI-RS resources. A UE measures a channel for each resource and selects/uses a resource to use 2D domain including a vertical domain. For example, when $N_{total}$=32 is satisfied, 4 CSI-RS resources each of which has 8 ports can be configured within a single CSI process. In this case, a precoding applied to a CSI-RS resource is transparent to a UE. A UE measures a channel for each resource, selects a best resource, and transmits information corresponding to a precoding or a resource index to a base station. The base station transmits data to the UE using the precoding or a precoding applied to a resource of the resource index.

To this end, the UE reports a beam index (BI) to the base station. The UE selects a resource to be used for transmitting data according to a reference such as CSI or the like and can transmit an index of the resource or a precoding to the base station. This may become a periodic report reported via PUCCH or an aperiodic report reported via PUSCH. In this case, the BI is regarded as one of CSI and can be transmitted together with different aperiodic CSI. In this case, if the base station transmits an aperiodic CSI request to the UE via UL DCI, or the like, the UE can transmit aperiodic CSI to the base station via PUSCH.

In this case, the UE can transmit the BI together with the aperiodic CSI report at partial timing only when the aperiodic CSI report is reported. This is because, since the BI is not quickly changing, frequent BI report is inefficient. Moreover, in order to calculate the BI, it is necessary for the UE to perform CSI calculation on each of the CSI-RS resources. This may act as a burden to the UE.

To this end, the base station may set "BI reporting duration" to the UE. The BI reporting duration may correspond to 'valid' time after the BI is transmitted. At the same time, the BI reporting duration may correspond to a period that it is not necessary for the UE to transmit a new BI to the base station. The "BI reporting duration" can be defined as follows.

Alt 1: BI Expiration Timer

Figure 6:
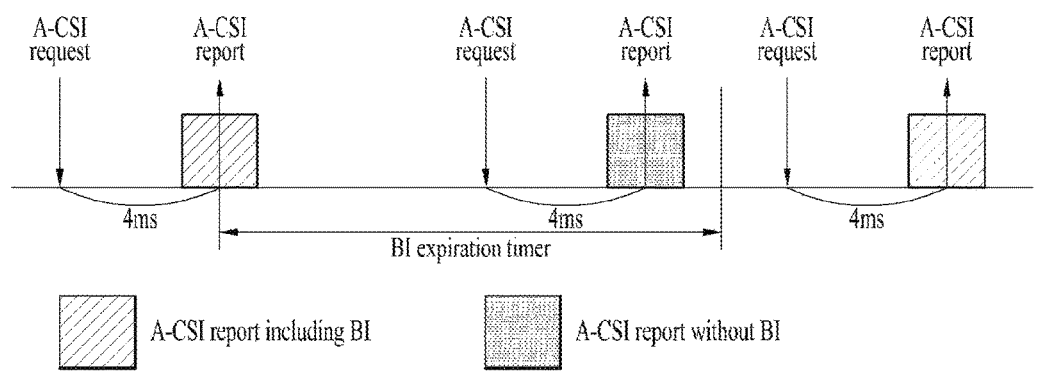
FIG. 6 illustrates a timing at which a beam index or a CSI-RS resource index is reported according to one embodiment of the present invention.

If "BI reporting duration" is set, the "BI reporting duration" operates as "BI expiration timer". The "BI expiration timer" corresponds to a period that it is not necessary for a UE to transmit a new BI to a base station during "BI expiration timer" which is defined after A-CSI reporting timing. FIG. 6 illustrates an operation of a UE according to the BI expiration timer.

Referring to FIG. 6, when a first A-CSI report is transmitted together with a BI, since time as much as "BI expiration timer" does not elapse after the A-CSI report is transmitted, a UE transmits A-CSI not including a BI as a second A-CSI report. For a third A-CSI report, since time as much as the "BI expiration timer" has elapsed after the first A-CSI report (BI) is transmitted, the UE transmits a BI and A-CSI together.

Reference timing for counting the "BI expiration timer" can be configured by a different timing rather than the A-CSI reporting timing. For example, A-CSI request timing rather than the A-CSI reporting timing can be used as the reference timing for counting the BI expiration timer. In this case, when A-CSI report corresponding to a certain A-CSI request including a BI is transmitted, the UE can perform A-CSI report not including a BI in response to A-CSI request received from a base station before BI expiration timer elapses after the A-CSI request.

Alt 2: BI Window

Alt 2-1: Report-Based BI Window

If "BI reporting duration" is set, the "BI reporting duration" may operate as a BI window. A-CSI reporting timing is divided into BI windows. A UE reports a BI one time only via A-CSI within a single BI window. This operation is shown in FIG. 7.

Figure 7:
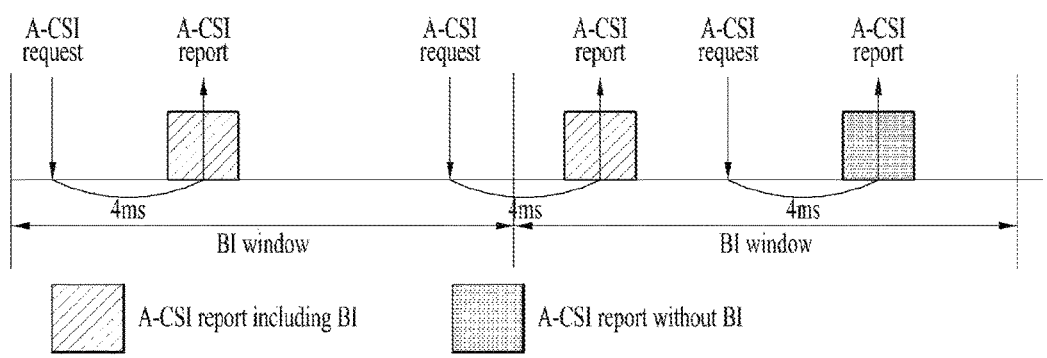
FIG. 7 illustrates a timing at which a beam index or a CSI-RS resource index is reported according to one embodiment of the present invention.

Referring to FIG. 7, since first and second A-CSI reports correspond to a first A-CSI report in each BI window, a UE transmits A-CSI together with a BI. However, since a third A-CSI report corresponds to a second report within a BI window, the UE can transmit A-CSI without a BI.

Alt 2-2: Request-Based BI Window

Or, it may operate on the basis of A-CSI request instead of the A-CSI report of the "report-based BI window". This may indicate that A-CSI request timing is divided into BI windows and there is only one A-CSI request for performing A-CSI report including a BI within a single BI window. This operation is shown in FIG. 8.

Figure 8:
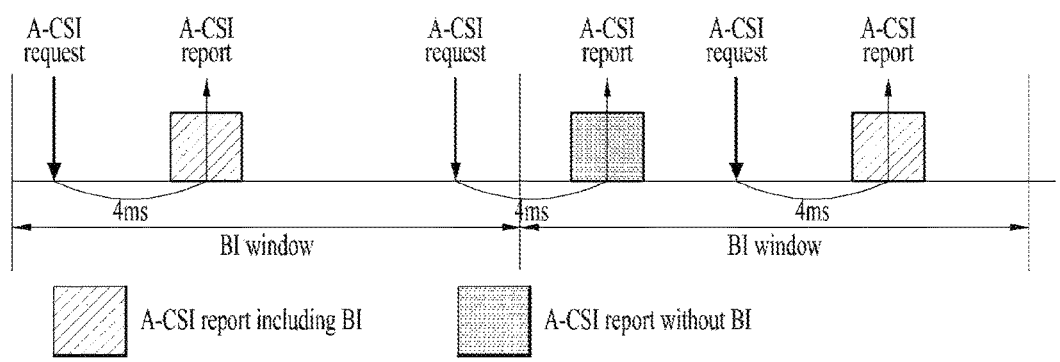
FIG. 8 illustrates a timing at which a beam index or a CSI-RS resource index is reported according to one embodiment of the present invention.

Referring to FIG. 8, since first and third A-CSI requests correspond to a first A-CSI request in each BI window, a UE can transmit A-CSI report corresponding to each A-CSI request together with a BI. However, since a second A-CSI request corresponds to a second A-CSI request within a BI window, the UE can report A-CSI in which a BI is not included in response to the second A-CSI request.

The "BI reporting duration" should be agreed or signaled between a base station and a UE. To this end, if a corresponding window size is determined in advance, it may operate without separate signaling. Or, the BI reporting duration can be transmitted via higher layer signaling such as RRC signaling or dynamic signaling such as DCI. The signaling can be explicitly or implicitly performed. In particular, it may use such a "BI reporting duration" as BI feedback periodicity (e.g., an integer multiple of an RI period) of PUCCH transmitted via RRC without signaling a separate "BI reporting duration".

Figure 9:
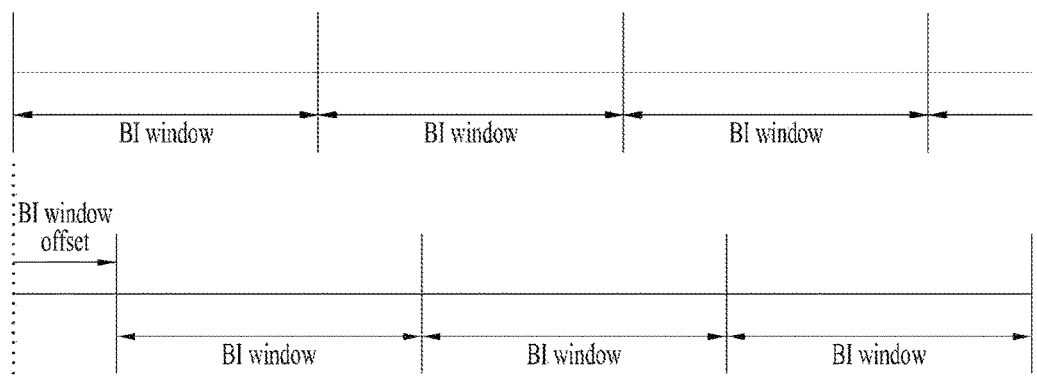
FIG. 9 illustrates an example of applying an offset for adjusting a timing at which a beam index or a CSI-RS resource index is reported according to one embodiment of the present invention.

In case of the "BI window", a separate BI window offset can be transmitted together with a BI reporting duration to find out a position of the BI window. In this case, a BI reporting offset of PUCCH transmitted via RRC can be used as a BI window offset of PUSCH. FIG. 9 illustrates an example of configuring a BI window according to a BI window offset.

In the present invention, when "A-CSI not including BI" is reported, it may be able to define or configure that A-CSI for a CSI-RS resource corresponding to a BI most recently reported by a UE is calculated and reported.

When the abovementioned operation is performed, if a base station fails to receive A-CSI including a BI, BI ambiguity occurs between the UE and the base station. In order to avoid the BI ambiguity, a part of transmitting the A-CSI not including the BI can be replaced with an operation of transmitting A-CSI including a not updated BI, which is previously transmitted by the UE. In particular, when the UE transmits A-CSI together with a BI, as mentioned in the foregoing description, the UE transmits the A-CSI together with the BI which is calculated on the basis of CSI and the like. On the contrary, when the UE transmits A-CSI not including a BI, the UE can transmit the A-CSI by including a most recently calculated BI as it is. In this case, when the UE transmits A-CSI together with a not updated BI, the UE can calculate A-CSI for a CSI-RS resource corresponding to the not updated BI and report the calculated A-CSI.

As mentioned in the foregoing description, according to the FD-MIMO class B, the K number of CSI-RS resources (K corresponds to the number of CSI-RS resources existing within a CSI process) are included in a single CSI process, a CSI-RS is selected via a BI, or the like, and a BI applied to the selected CSI-RS resource is used for DL data transmission. When a UE is configured by the FD-MIMO class B having the K ($K > K_{th}$ (e.g., $K_{th} = 1$)) number of CSI-RS resources and the UE successfully receives an aperiodic CSI request including a report on the P number of FD-MIMO class B CSI process(s) ($P >= 1$) having the $K_i$ (i corresponds to a CSI process index) number of CSI-RS resources, if there are R (e.g., R=1) number of unreported A-CSI for the P number of CSI process(s) or the $P_k$ ($P_k <= p$) number of CSI process(s) included in the CSI process(s) (for example, if the UE receives the R number of additional aperiodic CSI requests in response to the same CSI process prior to the timing of performing aperiodic CSI report in response to an aperiodic CSI request for the FD-MIMO class B CSI process received by the UE), it may not expect that the UE updates and transmits all BIs or BI(s) for the CSI process(s) in response to the aperiodic CSI request.

Or, a legacy or FD-MIMO class A CSI process can be included in the CSI process for the UE instead of the FD-MIMO class B. In this case, according to the FD-MIMO class A, a single CSI resource may have more ports (e.g., 16 ports) without using BI reporting or a CSI process having the extended number of ports (e.g., 16 ports) compared to a legacy CSI resource by aggregating two or more CSI resources can be used.

When a UE is configured by the FD-MIMO class B having the K ($K > K_{th}$ (e.g., $K_{th} = 1$)) number of CSI-RS resources and the UE successfully receives an aperiodic CSI request including a report on the P number of FD-MIMO class B CSI process(s) ($P >= 1$) having the $K_i$ (i corresponds to a CSI process index) number of CSI-RS resources, if there is unreported A-CSI for the R (e.g., R=1) number of CSI processes (including a legacy CSI process, an FD-MIMO class A, and an FD-MIMO class B CSI process) (for example, when a UE receives an aperiodic CSI request for the FD-MIMO class B CSI process, if there is unreported CSI for the R number of FD-MIMO class A, the FD-MIMO class B, and the legacy CSI process), it may not expect that the UE updates and transmits all BIs or BI(s) for a part of the FD-MIMO class B CSI process(s) in response to the aperiodic CSI request. In this case, an FD-MIMO class B CSI process, which is not updated by the UE, may correspond to an FD-MIMO class B CSI process having the Rc ($>=0$) number of lower indexes.

The $k_{th}$, the R, and the Rc can be defined by the base station and the UE in advance (e.g., via UE capability signaling). Or, the base station may configure the $k_{th}$, the R, and the Rc via higher layer signaling such as RRC. Moreover, technologies included in the present specification can be used independently or together.

In particular, as mentioned in the foregoing description, "legacy CSI relaxation" considering CA situation (shall be described in "reference" part) and a CRI (BI) relaxation operation described in the present invention can be applied together in a manner of being combined with each other. It may be able to define/configure the FD-MIMO class B (or, FD-MIMO class A) CSI process to be preferentially applied to the legacy CSI relaxation in a form of being considered as a single CSI process. If a specific FD-MIMO class B CSI process(s) is considered as a "not updated CSI process" due to the application of the abovementioned operation (in consideration of the $N_u$ number of not reported CSI processes), it may preferentially determine not to update all CRI/CSI reports. On the contrary, if a specific FD-MIMO class B CSI process(s) is considered as a "CSI process to be updated", the "CRI relaxation rule" proposed by the present invention is continuously applied to the specific FD-MIMO class B CSI process(s). In particular, the operation proposed by the present invention can be extensively applied to a situation considering CA.

REFERENCE

It may not expect that a UE receives two or more CSI report requests in a given single subframe.

When two or more CSI processes for a service cell are set to a UE and the UE receives an aperiodic CSI report request for triggering a CSI report according to table 9, if the UE has the $N_u$ number of not reported CSI processes associated with different aperiodic CSI requests for the serving cell, it may not expect that UE updates CSI corresponding to a CSI reference resource for all CSI processes except the max ($N_x-N_u$, 0) number of lower indexes for the serving cell associated with the received aperiodic CSI report request. In this case, a CSI process associated with a CSI request should be counted as not reported in a subframe prior to a subframe in which PUSCH delivering corresponding CSI is transmitted. $N_{CSI-P}$ corresponds to the maximum number of CSI processes supported by a UE for the serving cell. And:

$N_x = N_{CSI-P}$ for FDD serving cell
For TDD serving cell,
If 4 CSI processes are set to a UE for the serving cell,
$N_x = N_{CSI-P}$
If 2 or 3 CSI processes are set to a UE for the serving cell,
$N_x = 3$.

If a value greater than $N_{CSI-P}$ as much as 1 is included in UE-EUTRA-Capability, the UE assumes a value of $N_{CSI-P}$ matched with a CSI process configuration of the UE. If there are values matched with a value greater than $N_{CSI-P}$ more than 1, the UE may assume a random number among the matched values.

If a plurality of cell groups are set to a UE and the UE receives a plurality of aperiodic CSI report requests in a subframe for different cell groups that trigger two or more CSI reports, it is not necessary for the UE to update CSI on CSI processes exceeding 5 CSI processes among CSI processes corresponding to triggered CSI reports.

As a different example, as mentioned in the foregoing description, it may define the CRI relaxation operation condition using $K > K_{th}$ (e.g., $k_{th}=4$). According to a standard, the maximum number of supported CSI processes is determined by 4 for a legacy UE. Hence, the CRI relaxation can be applied to the class B-related operation when the K is greater than 4 under the assumption that a level of a CSI-RS resource is similar to a level of a legacy CSI process. By doing so, an appropriate $K_{th}$ value can be defined or configured.

According to the present invention, in relation to a BI window to which the CRI relaxation is applied, it may be able to make relaxation to be applied to A-CSI report transmitted within 5 ms. A different value rather than 5 ms can be defined/configured in advance.

As a different scheme, a condition to which the CRI relaxation is to be applied can be defined/configured in a form described in the following.

When a class B CSI process of $N_{total} > N_{total\_th}$ is set to a UE, CRI and CSI can be always reported in the same subframe.

When a UE receives an aperiodic CSI report request in response to the CSI process, if the lastly updated CRI is reported within 5 ms compared to the timing of reporting aperiodic CSI which is reported in response to the received aperiodic CSI report request, it may not expect that CRI is to be updated.

In this case, $N_{total\_th}=12$ or 16 can be defined/configured in advance. In particular, the CRI relaxation operation can be defined/configured according to a value of $N_{total}$ corresponding to the sum of all CSI-RS ports belonging to the class B CSI process.

It is apparent that it is able to extensively apply the aforementioned methods in a manner of being combined with a CA situation. When UE capability is signaled, a UE can signal the number of the class B CSI processes capable of being configured (across CCs).

Figure 10:
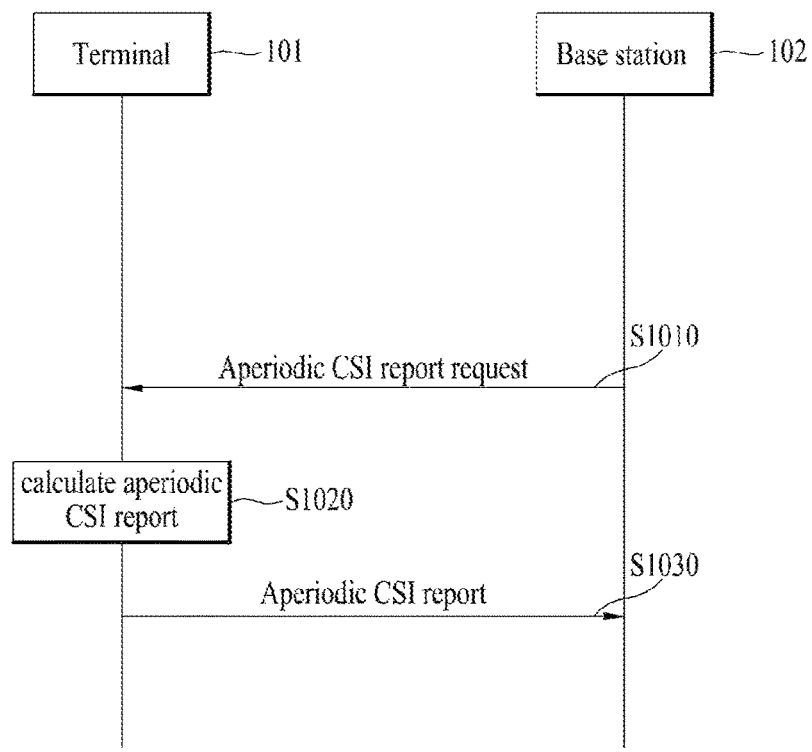
FIG. 10 is a flowchart for an operation according to one embodiment of the present invention.

FIG. 10 is a flowchart for an operation according to one embodiment of the present invention.

FIG. 10 relates to a method of reporting a channel state in a wireless communication system. The method can be performed by a terminal 101. A method of aperiodically reporting a channel state in a wireless communication system may be performed by a terminal.

The terminal may receive a configuration for one or more channel state information (CSI) processes including a plurality of CSI-reference signal (CSI-RS) resources from a base station. It may apply precoding to each of a plurality of the CSI-RS resources.

The terminal may receive an aperiodic CSI report request from the base station [S1010]. The terminal may transmit aperiodic CSI on a CSI process indicated by the received aperiodic CSI report request to the base station [S1030]. When a predetermined time does not elapsed after a CSI-RS resource index for the CSI process indicated by the aperiodic CSI report request is reported, the aperiodic CSI transmitted by the terminal may include the CSI-RS resource index for the indicated CSI process which is not updated.

Also, information on the remaining channel states included in the aperiodic CSI may be calculated on a CSI-RS resource indicated by the CSI-RS resource index.

Further, the predetermined time may correspond to time for 5 subframes.

Further, the CSI-RS resource index may be transmitted together with other channel state-related information.

Further, when a specific time does not elapse after a CSI-RS resource index for a CSI process indicated by the aperiodic CSI report request is reported and the total number of antenna ports for all CSI-RS resources of the CSI process exceeds a threshold, the aperiodic CSI transmitted by the terminal may include the CSI-RS resource index for the indicated CSI process which is not updated.

Further, when a specific time does not elapse after a CSI-RS resource index for a CSI process indicated by the aperiodic CSI report request is reported and the number of a plurality of the CSI-RS resources exceeds a threshold, the aperiodic CSI transmitted by the terminal may include the CSI-RS resource index for the indicated CSI process which is not updated.

In the foregoing description, embodiments of the present invention have been briefly explained with reference to FIG.

10. An embodiment related to FIG. 10 can alternatively or additionally include at least a part of the aforementioned embodiments.

Figure 11:
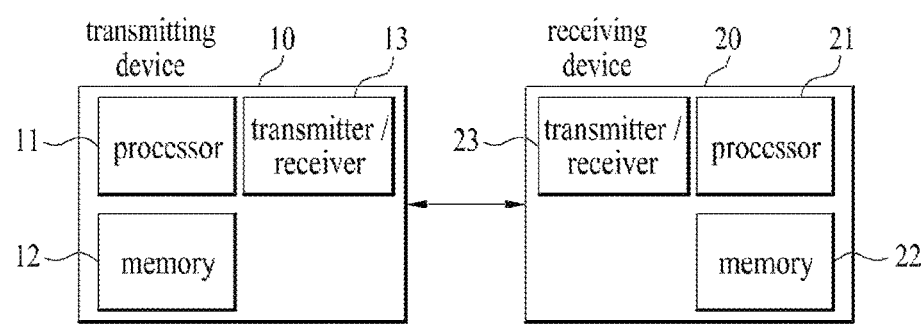
FIG. 11 is a block diagram of a device for implementing embodiment(s) of the present invention.

FIG. 11 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of reporting an aperiodic channel state by a terminal in a wireless communication system, the method comprising:

receiving a configuration for one or more channel state information (CSI) processes including a plurality of CSI-reference signal (CSI-RS) resources from a base station, wherein a precoding is applied to each of the plurality of the CSI-RS resources;

receiving an aperiodic CSI report request from the base station at subframe #n; and transmitting an aperiodic CSI on a CSI process indicated by the received aperiodic CSI report request to the base station at subframe #n+4, wherein the transmitted aperiodic CSI includes a CSI-RS resource index for the indicated CSI process, wherein, when a predetermined time does not elapse after the CSI-RS resource index for the indicated CSI process was reported and last updated to the base station, the CSI-RS resource index for the indicated CSI process included in the transmitted aperiodic CSI is not updated, and wherein the predetermined time corresponds to a time period for 5 subframes.

2. The method of claim 1, wherein remaining channel state-related information included in the transmitted aperiodic CSI is calculated on a CSI-RS resource indicated by the CSI-RS resource index.

3. The method of claim 1, wherein the CSI-RS resource index is always transmitted together with other channel state-related information.

4. The method of claim 1, wherein the transmitted aperiodic CSI includes the CSI-RS resource index for the CSI process which is not updated when a specific time does not elapse after the CSI-RS resource index for the CSI process indicated by the aperiodic CSI report request was reported and the total number of antenna ports for all CSI-RS resources of the CSI process exceeds a threshold.

5. The method of claim 1, wherein the transmitted aperiodic CSI includes the CSI-RS resource index for the CSI process which is not updated when a specific time does not elapse after the CSI-RS resource index for the CSI process indicated by the aperiodic CSI report request was reported and the number of the plurality of the CSI-RS resources exceeds a threshold.

6. A terminal configured to report an aperiodic channel state in a wireless communication system, comprising:
a transmitter;
a receiver; and
a processor operatively coupled to and controlling the transmitter and the receiver, wherein the processor is configured to:
receive a configuration for one or more channel state information (CSI) processes including a plurality of CSI-reference signal (CSI-RS) resources from a base station, wherein a precoding is applied to each of the plurality of the CSI-RS resources,
receive an aperiodic CSI report request from the base station at subframe #n, and
transmit an aperiodic CSI on a CSI process indicated by the received aperiodic CSI report request to the base station at subframe #n+4, wherein the transmitted aperiodic CSI includes a CSI-RS resource index for the indicated CSI process, wherein, when a predetermined time does not elapse after the CSI-RS resource index for the indicated CSI process was reported and last updated to the base station, the CSI-RS resource index for the indicated CSI process included in the transmitted aperiodic CSI is not updated, and wherein the predetermined time corresponds to a time period for 5 subframes.

7. The terminal of claim 6, wherein remaining channel state-related information included in the transmitted aperiodic CSI is calculated on a CSI-RS resource indicated by the CSI-RS resource index.

8. The terminal of claim 6, wherein the CSI-RS resource index is always transmitted together with other channel state-related information.

9. The terminal of claim 6, wherein the transmitted aperiodic CSI includes the CSI-RS resource index for the CSI process which is not updated when a specific time does not elapse after the CSI-RS resource index for the CSI process indicated by the aperiodic CSI report request was reported and the total number of antenna ports for all CSI-RS resources of the CSI process exceeds a threshold.

10. The terminal of claim 6, wherein the transmitted aperiodic CSI includes the CSI-RS resource index for the CSI process which is not updated when a specific time does not elapse after the CSI-RS resource index for the CSI process indicated by the aperiodic CSI report request was reported and the number of the plurality of the CSI-RS resources exceeds a threshold.

* * * * *